C. W. BEEBEE.
Blacking-Boxes.

No. 147,034.  Patented Feb. 3, 1874.

Witnesses:
Chas Nida
Alex F. Roberts

Inventor:
C. W. Beebee
Per Munn & Co
Attorneys.

UNITED STATES PATENT OFFICE.

CHARLES W. BEEBEE, OF RAVENSWOOD, NEW YORK.

IMPROVEMENT IN BLACKING-BOXES.

Specification forming part of Letters Patent No. 147,034, dated February 3, 1874; application filed September 27, 1873.

*To all whom it may concern:*

Be it known that I, CHARLES W. BEEBEE, of Ravenswood, in the county of Queens and State of New York, have invented a new and Improved Blacking-Box; and I do hereby declare that the following is a full, clear, and exact description of the same, reference being had to the accompanying drawing forming a part of this specification.

This invention has reference to that class of blacking-boxes which are constructed of wood and provided with a handle and cover; and it has for its object to improve the form of said boxes, so as to render the same more convenient and effective in use. The invention consists in forming the recess or cavity for the reception of the blacking by means of augers or boring-tools, so as to lessen the cost of manufacturing said boxes, and, at the same time, to form scalloped inner sides or projections, which are designed to form a surface for rubbing the brush, in order to spread the blacking evenly on the same.

Figure 1:
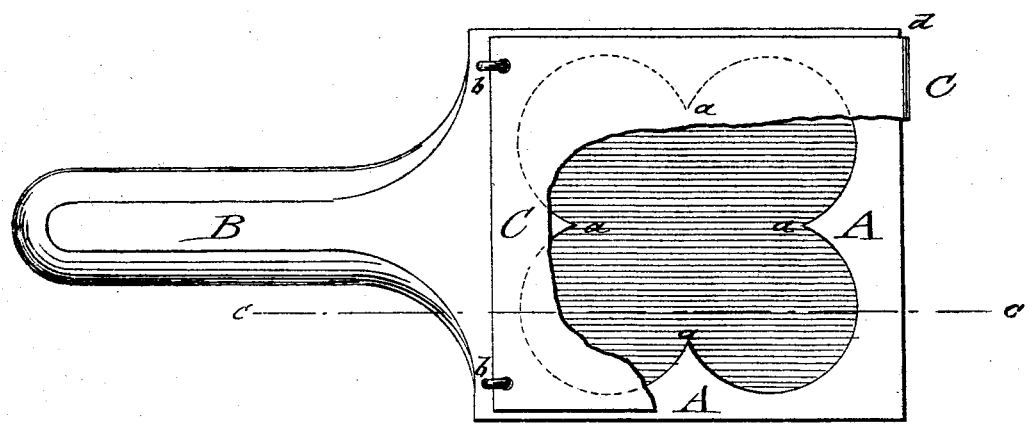
Figure 2:
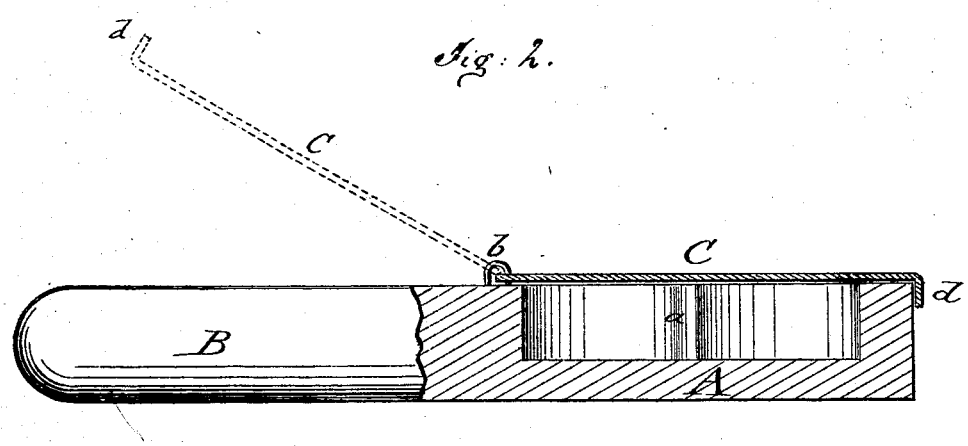

In the accompanying drawing, Figure 1 is a top view of my blacking-box, with part of the cover broken away to show the interior construction. Fig. 2 is a longitudinal section taken on the line *c c*, Fig. 1.

The box A, which is of any desired external form or configuration, is constructed of a block of wood, and is formed with a handle, B, as shown. The recess or cavity for containing the blacking is formed by grouping together a suitable number of augers and boring-tools, so as to form a cavity with the scalloped inner sides or inwardly-projecting ribs *a*. By forming the blacking recess as described, the cost and labor of coring the same in the manner heretofore practiced are overcome; and, furthermore, by providing the scalloped inner sides, a surface is formed against which the brush comes in contact when turned to receive a supply of blacking which is conducive of removing all excess of blacking from the outer bristles of the brush, and to spread the same more evenly over the center of the same.

Great annoyance is experienced with blacking-boxes of the ordinary construction, for it is impossible to avoid taking up from the same a too large amount of blacking, which then generally oozes out through the outer bristles of the brush.

By my invention the blacking is scraped off from the outer bristles, and caused to collect more in the center of the brush, so that when pressure is applied to the latter the blacking will flow from the center to the outer bristles.

In connection with a blacking-box of the above description, I propose to employ a hinged metallic cover, C, which is pivoted, by staples *b*, to the rear end of the box, and provided with a downwardly-projecting flange, *d*, which laps on the front side of the box when the cover is turned down. Said cover is capable of being thrown back onto the handle, when it forms a shield for preventing the hand from being soiled, and as a surface for rubbing or reducing lumps of blacking.

The recessed part or inside of the box is coated with gum or shellac in order to prevent the oil or blacking from penetrating the pores of the wood.

What I claim is—

A wooden blacking-box provided with a cavity or recess for the reception of the blacking, having scalloped sides or inwardly-projecting ribs *a*, as and for the purpose specified.

CHARLES W. BEEBEE.

Witnesses:
 PAUL GOEPEL,
 ALEX. F. ROBERTS.